United States Patent Office 3,435,048
Patented Mar. 25, 1969

3,435,048
PROCESS FOR PREPARING 5-ARYL-3-AMINOISOXAZOLES
Issei Iwai and Norio Nakamura, Tokyo, Japan, assignors to Sankyo Company Limited, Tokyo, Japan
No Drawing. Original application Sept. 10, 1965, Ser. No. 486,518. Divided and this application Oct. 11, 1967, Ser. No. 674,640
Claims priority, application Japan, Sept. 14, 1964, 39/52,516, 39/52,517
Int. Cl. A61k 27/00; C07d 85/22, 85/46
U.S. Cl. 260—307
1 Claim

ABSTRACT OF THE DISCLOSURE

Process for the preparation of 3-amino-5-phenylisoxazole derivatives. The corresponding β-bromocinnamonitrile derivate is reacted with hydroxylamine in the presence of an alkali metal hydroxide. The 3-amino-5-phenylisoxazole derivatives are useful intermediates for the synthesis of sulfa drugs.

---

This case is divisional of Serial No. 486,518, filed September 10, 1965.

SUMMARY OF THE INVENTION

This invention relates to a novel process for preparing 3-aminoisoxazole derivatives. More particularly, it relates to a novel process for preparing the 3-aminoisoxazole derivatives having the formulae

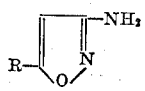
(I)

wherein R represents hydrogen; an alkyl group containing 1–5 carbon atoms such as methyl, ethyl, propyl, butyl or pentyl; or an unsubstituted or substituted phenyl group such as phenyl, p-, m- or o-nitrophenyl, p-, m- or o-aminophenyl, p-, m- or o-alkylphenyl for example p-methylphenyl, o-ethylphenyl, m-methylphenyl, o-n-propylphenyl or p-pentylphenyl, p-, m- or o-alkoxyphenyl for example p-methoxyphenyl, m-ethoxyphenyl or o-n-propoxyphenyl, or p-, m-, o-halogenophenyl for example p-, m- or o-bromophenyl or p-, m- or o-chlorophenyl and

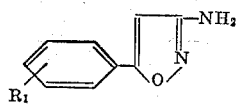
(II)

wherein $R_1$ represents hydrogen; halogen atom such as bromine; chlorine or iodine; an alkoxy group containing 1–5 carbon atoms such as methoxy, ethoxy, propoxy, butoxy or pentoxy; or an alkyl group containing 1–5 carbon atoms such as methyl, ethyl, propyl, butyl or pentyl.

The 3-aminoisoxazole derivatives having the above Formulae I and II are useful as an intermediate for the synthesis of sulfonamide compounds which are widely used as antibacterial agent.

It is an object of this invention to provide a novel and advantageous process for preparing the 3-aminoisoxazole derivatives having the above Formulae I and II which are useful intermediates for the synthesis of numerous valuable antibacterial agents.

Other objects of this invention will become apparent as the description of this invention proceeds.

Heretofore, as the process for the preparation of 3-aminoisoxazole derivatives, the process claimed and disclosed in Japanese Patent No. 290,449; No. 303,133 and No. 303,134 has been known. The above prior process involves the steps of reacting acylpyruvic acid alkyl ester with hydroxylamine hydrochloride to form 5-alkyl-3-carbalkoxy-isoxazole, reacting the latter compound with ammonia to form 5-alkyl-3-isoxazole carboxamide and treating the latter compound with alkali metal hypohalite and potassium hydroxide to produce the desired 3-aminoisoxazole derivatives.

As a result of various studies in order to find out a commercially advantageous process for preparing 3-aminoisoxazole derivatives, it has now been unexpectedly found that 3-aminoisoxazole derivatives can be easily obtained in a high yield by reacting propiolonitrile derivative or β-halogenocinnamonitrile derivative with hydroxylamine in the presence of an alkali metal hydroxide.

According to the process of this invention, the 3-aminoisoxazole derivatives having the above Formulae I and II can be obtained by reacting a compound selected from the class of the propiolonitrile derivative having the formula

(III)

wherein R is as defined above and the 3-bromo-cinnamonitrile derivative having the formula

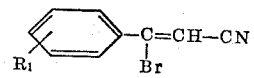
IV)

wherein $R_1$ is as defined above with hydroxylamine in the presence of an alkali metal hydroxide.

In carrying out the process of this invention, where the propiolonitrile derivative having the above Formula III is employed as a starting material, the starting propiolonitrile is reacted with hydroxylamine in the presence of an alkali metal hydroxide and, optionally, in the presence of a suitable solvent. Though it is not essential in the reaction to employ a suitable solvent, it is desirable to employ such suitable solvent as water, water-miscible organic solvent, for example, alcohols, dioxane, tetrahydrofuran and the like or a mixture thereof and, if employed, among others, aqueous alcohols for example aqueous methanol or aqueous ethanol are most preferable. Suitable alkali metal hydroxide to be employed are sodium, potassium and lithium hydroxides and sodium hydroxide or potassium hydroxide is most preferable. The reaction time and temperature are not critical features of this invention. Generally speaking, the reaction is usually carried out at a temperature ranging from above room temperature or about 20° C. to a reflux temperature of the solvents employed. The reaction time will depend upon the reaction temperature employed and the reaction is generally carried out for about 1–20 hours, and preferably at about 20–60° C. for about 11–18 hours. The reagent, hydroxylamine, may be in the form of a free base or an acid addition salt, but practically its acid addition salt such as hydrochloride, sulfate and the like is most preferable. After completion of the reaction, the reaction product having the above Formula I may be recovered from the reaction mixture and purified by any of conventional methods. For instance, the reaction mixture is extracted with a suitable extract solvent for example ether, the solvent is distilled off from the extract and the residue is recrystallized from a suitable solvent for example aqueous ethanol to obtain the desired product in a purified form. The above extract may also be extracted with aqueous acid for example aqueous hydrochloric acid, the acid extract neutralized with a suitable alkaline substance for example sodium hydroxide and the end product thus separated recrystallized from a suitable solvent to obtain the pure end product. The starting propiolonitrile derivative where R is a substituted phenyl is novel compound and may be prepared from the corresponding acetylene by the procedure similar to that appeared in Annales de Chimique et de Physique, vol. 4, (9), 28 (1915).

In carrying out the process of this invention, where the 3-bromocinnamonitrile having the above Formula IV is employed as a starting material, the reaction may be satisfactorily conducted in the same manner as in case of the above-mentioned propiolonitrile. The reaction time and temperature and other reaction conditions may also be similar to those of the propiolonitrile. In this case, there are obtained as reaction product the 3-aminoisoxazole derivatives having the above Formula II. Likewise, the reaction product having the Formula II may be recovered and purified by a conventional method. The starting substituted β-bromocinnamonitrile derivative is novel compound and may be prepared by reacting the corresponding phenylacetylene with cyanogen bromide in the presence of aluminum bromide.

The following examples are given only for the illustration of this invention, and not for the purpose of limiting the scope thereof.

Example 1.—Preparation of 3-amino-5-phenylisoxazole

To a solution of 10.6 g. of β-bromocinnamonitrile in 80 ml. of ethanol is added a solution of 18 g. of hydroxylamine hydrochloride in 105 ml. of a 10% aqueous sodium hydroxide solution. The mixture is allowed to stand at room temperature overnight. Thereafter, the reaction mixture is extracted twice with ether, the combined ether extract is washed with a saturated aqueous sodium chloride solution, dried over anhydrous sodium sulfate and the ether is distilled off. The residue is then recrystallized from aqueous ethanol to give 7.7 g. of 3-amino-5-phenylisoxazole, melting at 137–138° C. Yield: 94%.

Example 2.—Preparation of 3-amino-5-p-bromophenylisoxazole

To a solution of 2.9 g. of β-bromo-p-bromocinnamonitrile in 30 ml. of ethanol is added a solution of 0.9 g. of hydroxylamine hydrochloride in 30 ml. of a 10% aqueous sodium hydroxide solution. The mixture is allowed to stand at room temperature overnight. Thereafter, the reaction mixture is extracted several times with ether, the combined ether extract is extracted three times with 10% aqueous hydrochloric acid and the combined acidic extract is neutralized with a 10% aqueous sodium hydroxide solution to separate a crystalline substance. The substance thus separated is recovered by filtration, washed with water and recrystallized from aqueous ethanol to give 1.9 g. of 3-amino-5-p-bromophenylisoxazole, melting at 147–149° C. Yield: 79%.

*Analysis.*—Calculated for $C_9H_7ON_2Br$: C, 45.39; H, 2.98; N, 11.77. Found: C, 45.23; H, 2.98; N, 11.73.

Example 3.—Preparation of 3-amino-5-p-methoxyphenylisoxazole

To a solution of 2.4 g. of β-bromo-p-methoxycinnamonitrile in 10 ml. of ethanol is added a solution of 2.1 g. of hydroxylamine hydrochloride in 16 ml. of a 10% aqueous sodium hydroxide solution. The mixture is allowed to stand at room temperature overnight. Thereafter, the reaction mixture is extracted several times with ether and the combined ether extract is further extracted three times with 10% aqueous hydrochloric acid. The combined acid extract is neutralized with a 10% aqueous sodium hydroxide solution and the crystalline substance thus separated is recovered by filtration, washed with water and then recrystallized from aqueous ethanol to give 1.4 g. of 3-amino-5-p-methoxyphenylisoxazole, melting at 171–172° C. Yield: 74%.

*Analysis.*—Calculated for $C_{10}H_{10}O_2N_2$: C, 63.15; H, 5.30; N, 14.73. Found: C, 62.68; H, 5.37; N, 14.54.

Example 4.—Preparation of 3-amino-5-p-bromophenylisoxazole

To a solution of 8.2 g. of β-bromo-p-bromocinnamonitrile in 100 ml. of ethanol is added a solution of 11.0 g. of hydroxylamine hydrochloride in 100 ml. of a 10% aqueous sodium hydroxide solution. The mixture is allowed to stand at room temperature overnight. Thereafter, the reaction mixture is extracted twice with ether, the combined ether extract is extracted three times with 10% aqueous hydrochloric acid and the combined acidic extract is neutralized with an aqueous sodium hydroxide solution to separate a crystalline substance. The substance thus separated is recovered by filtration, washed with water and recrystallized from aqueous ethanol to give 3.8 g. of 3-amino-5-p-bromophenylisoxazole, melting at 147–149° C. Yield: 57%.

*Analysis.*—Calculated for $C_9H_7ON_2Br$: C, 45.39; H, 2.98; N, 11.77. Found: C, 45.23; H, 2.98; N, 11.73.

Example 5.—Preparation of 3-amino-5-p-methoxyphenylisoxazole

To a solution of 2.4 g. of β-bromo-p-methoxycinnamonitrile in 100 ml. of ethanol is added a solution of 2.1 g. of hydroxylamine hydrochloride in 16 ml. of a 10% aqueous sodium hydroxide solution. The mixture is allowed to stand at room temperature overnight. Thereafter, the reaction mixture is extracted twice with ether and the combined ether extract is further extracted three times with 10% aqueous hydrochloric acid. The combined acidic extract is neutralized with an aqueous sodium hydroxide solution and the crystalline substance thus separated is recovered by filtration, washed with water and then recrystallized from aqueous ethanol to give 1.0 g. of 3-amino-5-p-methoxyphenylisoxazole, melting at 171–172° C. Yield: 53%.

*Analysis.*—Calculated for $C_{10}H_{10}O_2N_2$: C, 63.15; H, 5.30; N, 14.73. Found: C, 62.68; H, 5.37; N, 14.54.

What is claimed is:
1. A process for preparing a compound having the formula

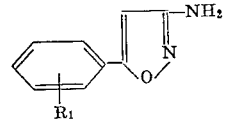

wherein $R_1$ represents hydrogen, halogen, alkoxy of 1–5 carbon atoms or alkyl of 1–5 carbon atoms, which comprises reacting a compound having the formula

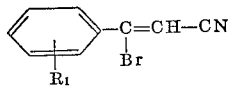

wherein $R_1$ is as defined above with hydroxylamine in the presence of an alkali metal hydroxide.

References Cited

UNITED STATES PATENTS 3,242,189  3/1966  Bretschneider et al. __ 260—307

ALEX MAZEL, *Primary Examiner.*

R. J. GALLAGHER, *Assistant Examiner.*

U.S. Cl. X.R.

260—239.9; 424—272